No. 770,270. PATENTED SEPT. 20, 1904.
C. W. DEHN.
BOLT CUTTING MACHINE.
APPLICATION FILED JAN. 2, 1904.
NO MODEL.

Witnesses:
G. A. Pennington
Wm. H. Forth

Inventor:
Carl W. Dehn,
by Bakewell & Cornwall
Attys.

No. 770,270. Patented September 20, 1904.

UNITED STATES PATENT OFFICE.

CARL W. DEHN, OF TOPEKA, KANSAS, ASSIGNOR TO RELIANCE PNEUMATIC TOOL COMPANY, OF ST. LOUIS, MISSOURI, A CORPORATION OF MISSOURI.

BOLT-CUTTING MACHINE.

SPECIFICATION forming part of Letters Patent No. 770,270, dated September 20, 1904.

Application filed January 2, 1904. Serial No. 187,534. (No model.)

*To all whom it may concern:*

Be it known that I, CARL W. DEHN, a citizen of the United States of America, residing at Topeka, in the county of Shawnee and State of Kansas, have invented new and useful Improvements in Bolt-Cutting Machines, of which the following is a specification.

The invention relates more particularly, though not exclusively, to machines operated by fluid-pressure and used for cutting stay-bolts preparatory to riveting them.

The general object is to improve on bolt-cutting machines, especially in the matters of economy of manufacture and of minimizing the liability of the parts to breakage.

More especial objects are to provide means other than a toggle-joint or bell-crank, (which do not give entire satisfaction in this class of machines,) whereby the power is applied with increased leverage toward the end of the stroke in order that the greatest force is applied when the jaws are cutting the middle (the thickest section) of the bolt; to provide means for cutting stay-bolts of any length; to provide means for preventing the cutting-jaws from coming in contact with each other at the end of the stroke, and to provide a cushion for the piston at the end of the stroke, so as to take up the jar, and thereby reduce to a minimum the liability of breakage of the parts, especially of the piston-rod and cross-head and the frame, from this cause.

The invention consists of the novel combination, arrangement, and disposition of the parts, the preferred form of the embodiment whereof is herein described and claimed, and is shown in the accompanying drawings, forming part of this specification, in which—

Figure 1:
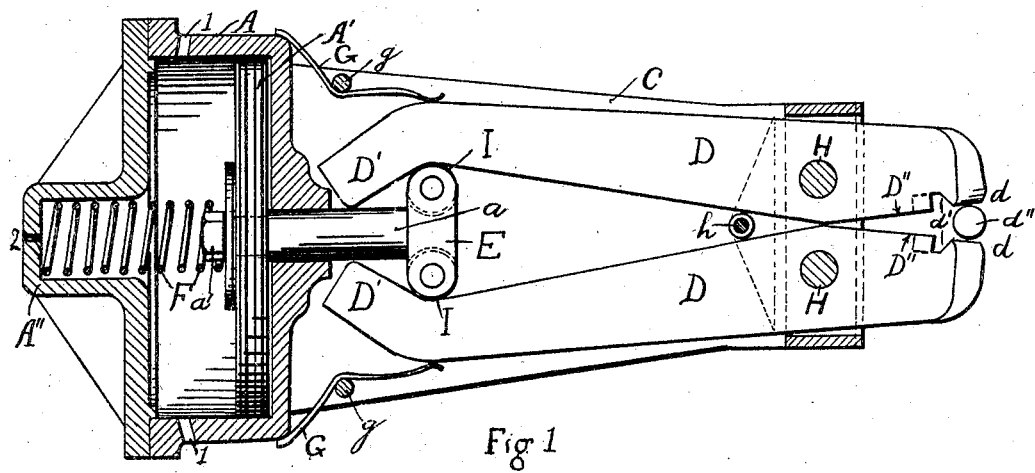
Figure 2:
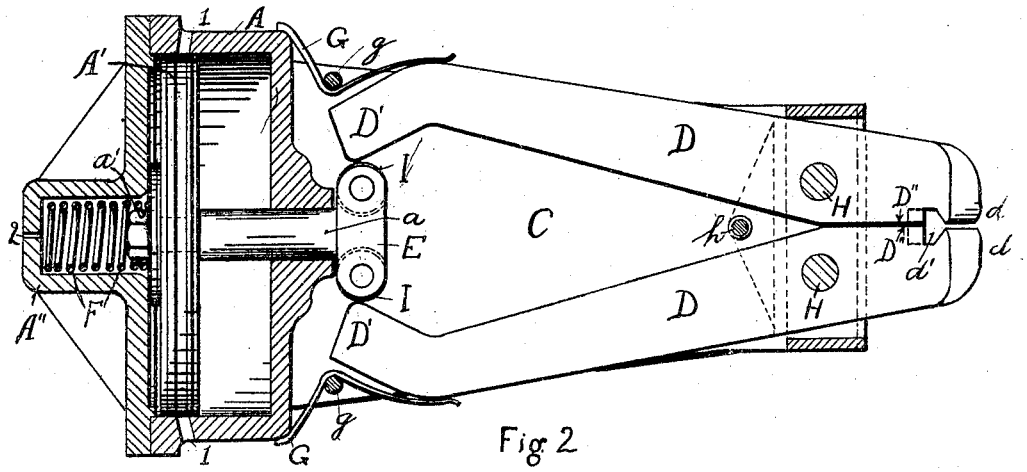
Figure 3:
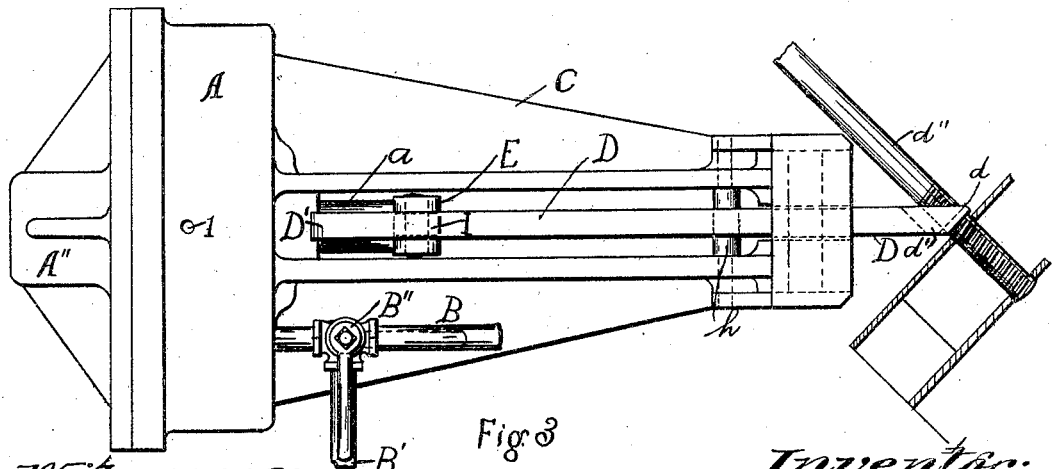

Figure 1 is a longitudinal central section of a bolt-cutter made in accordance with my invention with the jaws open. Fig. 2 is a similar view showing the jaws forced together; and Fig. 3 is a top view of the same, the springs for restoring the levers to their normal positions being removed.

Like reference letters and numerals indicate like parts throughout the several views.

When making the device, as shown in the drawings, I first construct a cylinder A, preferably of the form shown and of any desired material and dimensions. In this cylinder moves a piston A', provided with a rod $a$, which passes out through the end of the cylinder, as shown. The cylinder is provided with a pipe B for the admission of the fluid intended to act upon the piston and a waste-pipe B', a cock B'' being used to put either one or the other of these pipes into connection with the interior of the cylinder. Integral with the cylinder or separate therefrom and attached thereto, as may be desired, is a frame C, made of any desired form and dimensions that will accommodate and permit the operation of the working parts of the device. Within this frame and extending out therefrom, as shown, are the levers D D, pivoted thereto, as shown at H H, and provided at their outer ends with diagonally-disposed cutting-jaws $d\ d$, which are adapted and intended for cutting off the bolt, as shown at $d''$, Figs. 1 and 3. The inner faces of the levers are provided with shoulders D'' D'', which prevent the cutting-jaws from coming into contact with each other when they are closed in the operation of cutting the bolt, experience having demonstrated that the bolt is usually snapped off before it is cut entirely through, permitting the jaws to come together with considerable force, thereby breaking them. For ordinary purposes the jaws should be permitted to close to about one-eighth inch of each other, at which point or before the bolt will snap off. There is an opening in the shoulders, as shown in the drawings, at $d'$, to admit the extension of the bolt between the levers, whereby, together with the diagonally-disposed cutting-jaws, a bolt of any length may be cut flush with the surface from which it extends.

$h$ is a separator to keep the opposite parts of the frame properly spaced apart to permit the free motion of the levers.

Attached to the outer end of the piston-rod $a$ is a cross-head E, preferably provided with rollers I I, adapted to engage the inner ends of the levers D D, said inner ends being bent toward each other and away from the pivots, as indicated by D' D'. The inward bend just mentioned refers, of course, only to the inner faces of the levers, as it is clear that it is immaterial in the form shown in the drawings what form the outer faces may have so long as they permit the proper operation of the parts.

A spring F, preferably seated in the diminished extension A'' of the cylinder, is provided to return the piston to its normal position when the fluid-pressure is released and the waste-pipe opened and the springs G G for the purpose of separating the jaws and restoring the levers to their normal positions.

The ports 1 1 permit the free flow of the atmospheric air into and out of the cylinder behind the piston as the piston is moved to and fro therein, but are so located, as indicated in the drawings, so to be closed before the piston has quite completed its stroke. A perforation 2 is provided in the extreme end of the cylinder to permit the slow escape of the air therefrom. In this way an air-cushion is formed to take up the jar at the end of the stroke.

When using this device, it may be suspended from a suitable crane in such a manner as to be freely moved in all directions or otherwise suitably supported, and it operates in the following manner: The jaws $d\ d$ being placed over the bolt, as indicated in Figs. 1 and 3, the cock B'' is turned to admit the air, steam, or other fluid used into the cylinder. The pressure of this fluid then forces the piston toward the left or rearwardly, considering the cutting-jaws as at the front of the machine, carrying with it the rod $a$ and cross-head E and forcing the inner ends of the levers apart and the cutting-jaws together, as shown in Fig. 2, to sever the bolt. As heretofore stated, the bolt is snapped off in the usual way; but the shoulders D'' D'' prevent the jaws from coming entirely together, and the cushion serves to ease the termination of the stroke. The cock is then turned to open the connection between the waste-pipe and the cylinder, whereupon the spring F will restore the piston to its normal position, the rod $a$ carrying the cross-head E and rollers I I forward and allowing the springs G G to return the levers and cutting-jaws to their normal position. The cutter can then be moved to the next bolt and the operation repeated, and so on, as often as necessary.

Some of the advantages in the construction and use of the improvements herein set out and claimed over the present state of the art are enumerated below. It will be noted that instead of beveling the ends of the levers toward each other and toward their pivots and forcing the cross-head toward the pivots, thereby operating the cutting-jaws with a diminishing leverage, the ends of the levers are bent toward each other and away from the pivots, and the cross-head is pulled away from the pivots, thereby operating the cutting-jaws with an increasing leverage. Furthermore, with the bevels the incline against which the cross-head is forced increases toward the end of the stroke, while in the present construction the incline becomes less as the levers are spread apart. In the present machine the leverage is increased and the friction diminished toward the end of the stroke, while in the case of the beveled ends just the opposite facts are true. As the machines are usually used in cutting round bolts, where the greatest power is required at the middle of the bolt, it is apparent that this feature materially increases the efficiency of the machine. Again, in former devices, where the cross-head is forced toward the pivots, the strain on the frame, which is usually of cast-iron, is tensional, while that on the piston-rod is compression, and in order to give proper rigidity to the cross-head and to the piston-rod in its bearings a guide-slot is a theoretic necessity in order to prevent the tendency to buckling and consequent wearing of the parts. In the present form and construction the strain on the frame is compression and that on the piston-rod tensional, while the guide-slots are not even a theoretic necessity and there is no tendency to buckling and the consequent wear of the parts is avoided. As the cast metal of the frame will stand about four times as much compression as tensional strain it is apparent that the frame is much stronger or may be made much lighter. With former devices having the cutting-jaws disposed at right angles to the plane in which the levers rock the reach of the jaws has been limited, and if the jaws should be disposed in the same plane with that of the levers it would not be possible to cut the bolt off squarely and flush with the surface from which it projects on account of the interference of the machine; but with the present machine having the diagonally-disposed cutting-jaws the bolt may be extended entirely through the levers and be cut squarely off at the proper point, so that a bolt of any length may be severed at one blow instead of being "chewed" off. The shoulders and air-cushion to limit and ease the end of the cutting stroke serve to reduce the wear and tear on the machine and to lighten the burden of the operation, thereby increasing the efficiency and durability of the machine.

I have shown the above form as illustrating the principles of my invention, but do not intend to limit myself unduly to the peculiarities of form or construction, but contemplate all changes in form, proportions, and the substitution of equivalent members as may be desirable and necessary.

Although I have described my machine as a bolt-cutter, I do not intend to limit myself to such use, since it is obvious to those skilled in the art that it may be readily adapted to cutting other things than bolts—such as rods, bars, and the like—and inasmuch as I so contemplate applying it I do not intend by the use of the words "bolt-cutting" machine to limit myself to any one particular use.

Having thus described my invention, what I claim as new, and desire to secure by Letters Patent, is—

1. In a bolt-cutting machine, the combination of the frame; the cutting-jaws; the levers pivoted in the frame to operate the cutting-jaws and having their ends bent toward each other and away from the pivots; and the cross-head engaging the bent ends.

2. In a bolt-cutting machine, the combination of the frame; the cutting-jaws; levers pivoted in the frame to operate the jaws and having their ends bent toward each other and away from the pivots; and the cross-head provided with rollers engaging the bent ends.

3. In a bolt-cutting machine, the combination of the frame; the levers pivoted therein and provided with cutting-jaws at their outer ends, their inner ends being bent toward each other and away from the pivots; and the cross-head provided with rollers engaging the bent ends.

4. In a bolt-cutting machine, the combination of the frame; the cylinder secured thereto; levers pivoted in the frame and provided with cutting-jaws at their outer ends, their inner ends being bent toward each other and away from the pivots; the cross-head provided with rollers engaging the bent ends; the piston in the cylinder, and the piston-rod therefor connected with the cross-head; and means whereby the movement of the piston in one direction forces the cutting-jaws together to sever the bolt and for restoring the parts to their normal position.

5. In a bolt-cutting machine, the combination of the frame; levers pivoted therein and provided with diagonally-disposed cutting-jaws at their outer ends, their inner ends being bent toward each other and away from the pivots; the cross-head provided with rollers engaging the bent ends; the cylinder secured to the frame; the piston in the cylinder, and the piston-rod therefor connected with the cross-head; the supply-pipe connected to one end of the cylinder; and means for controlling the flow of fluid therethrough.

6. In a bolt-cutting machine, the combination of the frame; levers pivoted therein and provided at their outer ends with diagonally-disposed cutting-jaws, their inner ends being bent toward each other and away from the pivots; shoulders to prevent the cutting-jaws from coming into contact with each other; the cross-head provided with rollers engaging the bent ends; the cylinder secured to the frame; the piston in the cylinder, and the piston-rod therefor connected with the cross-head; the fluid-supply pipe connected with one end of the cylinder and means for controlling the flow of fluid therethrough, the other end of the cylinder being perforated to form an air-cushion for the piston at the end of the stroke.

7. In a bolt-cutting machine, the combination of the frame; the cutting-jaws; levers pivoted in the frame to operate the cutting-jaws; shoulders on the levers to limit the closing movement of the jaws and to prevent the jaws from coming into contact with each other; the cylinder secured to the frame; the piston in the cylinder, and the piston-rod therefor; means whereby the movement of the piston in one direction forces together the cutting-jaws; the fluid-supply pipe connected with one end of the cylinder and means for controlling the flow of fluid therethrough, the other end of the cylinder being perforated to form an air-cushion for the piston.

8. In a bolt-cutting machine, the combination of the frame; the cutting-jaws; the levers pivoted in the frame to operate the cutting-jaws; the cylinder secured to the frame; the piston in the cylinder, and the piston-rod therefor; means whereby the movement of the piston in one direction forces together the cutting-jaws; the supply-pipe connected to one end of the cylinder, and means for controlling the flow of fluid therethrough, the outer end of the cylinder being perforated to form an air-cushion for the piston; and springs for restoring the parts to their normal positions.

9. In a bolt-cutting machine, cutting-jaws, levers for operating the same, and a lever-operating member movable along said levers toward and away from their pivot-points, said levers having cam-surfaces coöperating with said lever-operating member and inclining away from said pivot-points and across the path of movement of said lever-operating member; substantially as described.

In testimony whereof I have hereunto set my hand in the presence of witnesses.

CARL W. DEHN.

Witnesses:
P. C. Moore,
C. J. Rosen.